United States Patent [19]
Fuehrer et al.

[11] 3,987,874
[45] Oct. 26, 1976

[54] TRANSMISSION WITH RETARDER AND CONTROLS
[75] Inventors: Reece R. Fuehrer, Danville; Richard B. Anderson, Indianapolis, both of Ind.
[73] Assignee: General Motors Corporation, Detroit, Mich.
[22] Filed: June 24, 1975
[21] Appl. No.: 589,908

Related U.S. Application Data
[63] Continuation of Ser. No. 345,725, March 28, 1973, abandoned.

[52] U.S. Cl. ............................... 188/296; 60/366; 188/264 E; 192/3.34; 192/4 B
[51] Int. Cl.² ......................................... F16D 57/04
[58] Field of Search ........... 188/296, 264 E; 60/358, 60/363, 364, 366; 192/4 B, 3.34; 73/134

[56] References Cited
UNITED STATES PATENTS

| | | | |
|---|---|---|---|
| 2,742,981 | 4/1956 | Waldron | 188/296 |
| 2,768,711 | 10/1956 | Cline | 188/296 X |
| 2,786,552 | 3/1957 | LaMater et al. | 188/296 |
| 3,383,910 | 5/1968 | Tanaka | 188/296 X |
| 3,659,687 | 5/1972 | Edmunds | 192/3.34 X |

FOREIGN PATENTS OR APPLICATIONS

| | | | |
|---|---|---|---|
| 1,475,379 | 5/1969 | Germany | 188/296 |

*Primary Examiner*—George E. A. Halvosa
*Attorney, Agent, or Firm*—A. M. Heiter

[57] ABSTRACT

A dual chamber hydrodynamic retarder in a torque converter and power shift gear transmission. The retarder inlet at a point in the stator housing extends radially inward into a radial outer port of one stator in alignment with toric flow. The toroidal flow is divided by transfer ports extending radially outward and axially in the rotor to the other chamber to simultaneously fill both chambers. Each chamber has an outlet at a point in the stator and within its outer diameter dividing axial toric flow into outlet flow and continuing toric flow. Both the inlet and outlet provide toric flow pumping. The retarder valve, in the retarder off position, connects the retarder outlet to a dump exhaust, blocks the retarder inlet and connects a fluid supply through the cooler to a regulator valve regulating supply pressure at a low value, and throughout a range of retarder on positions connects without change of restriction in a loop circuit, the retarder outlet and supply through the cooler to the retarder inlet and a control exhaust is initially wide open for minimum pressure and retarding and closed exponentially relative to stroke to increase pressure and retarding until limited by the regulator valve.

31 Claims, 6 Drawing Figures

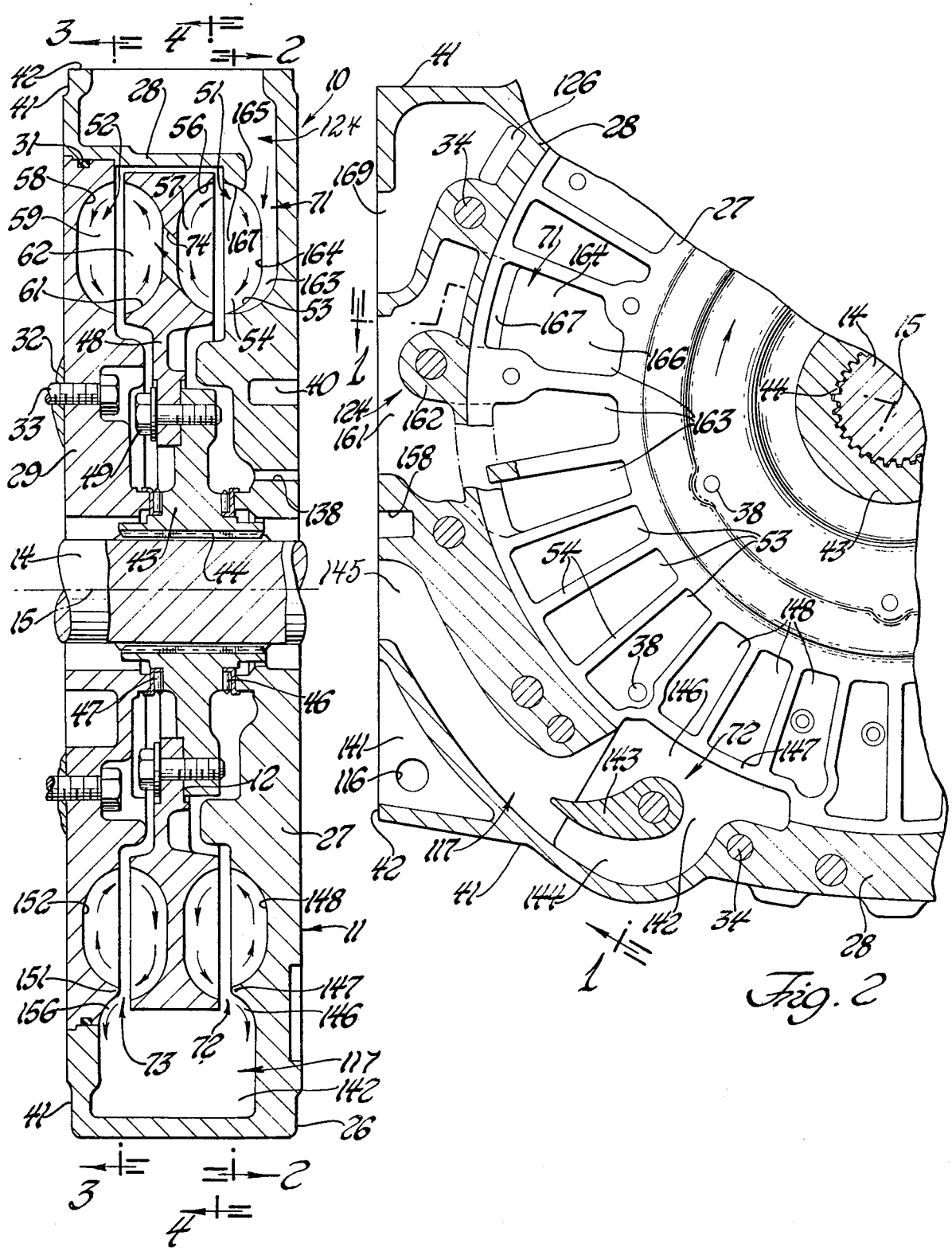

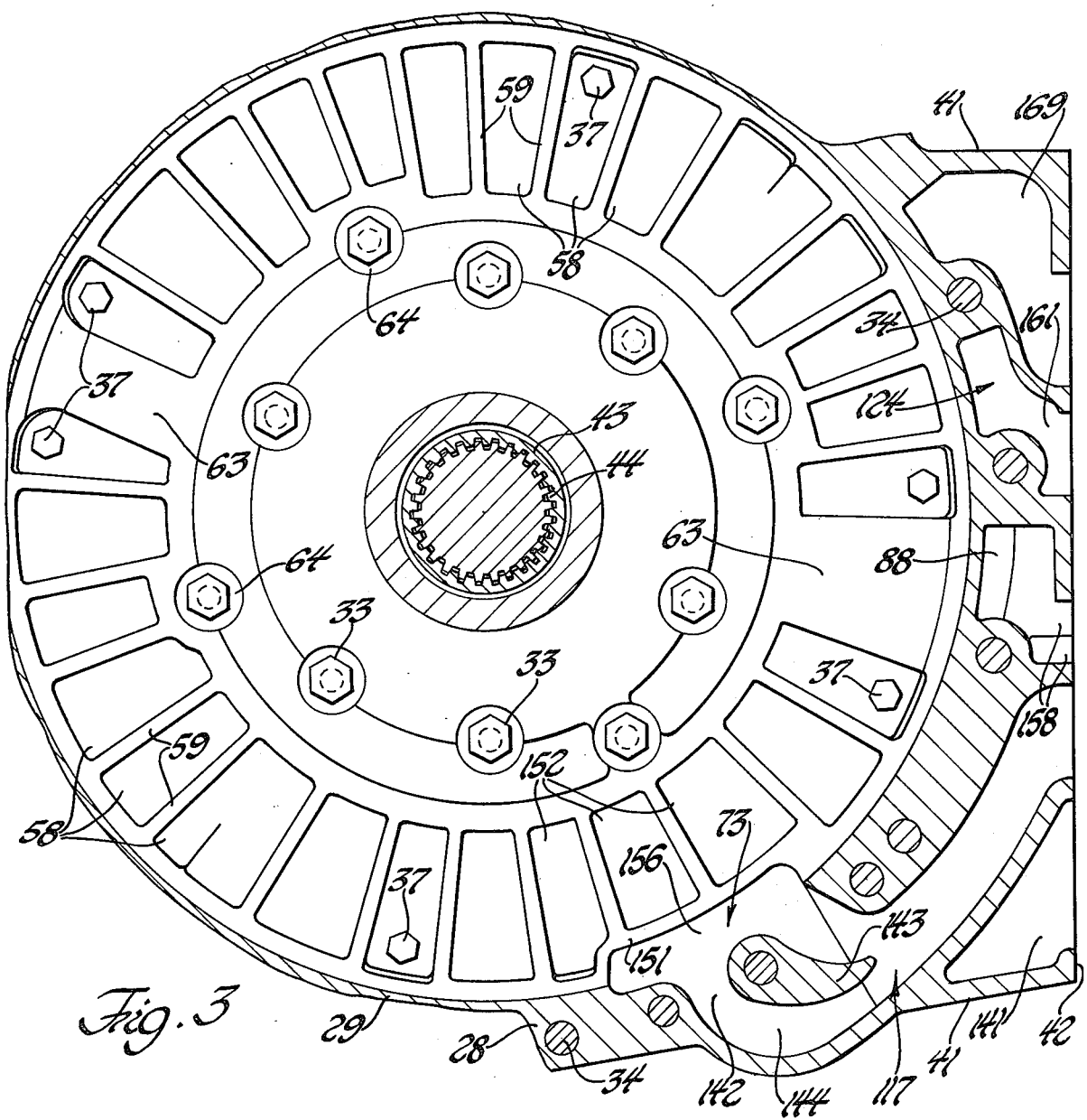
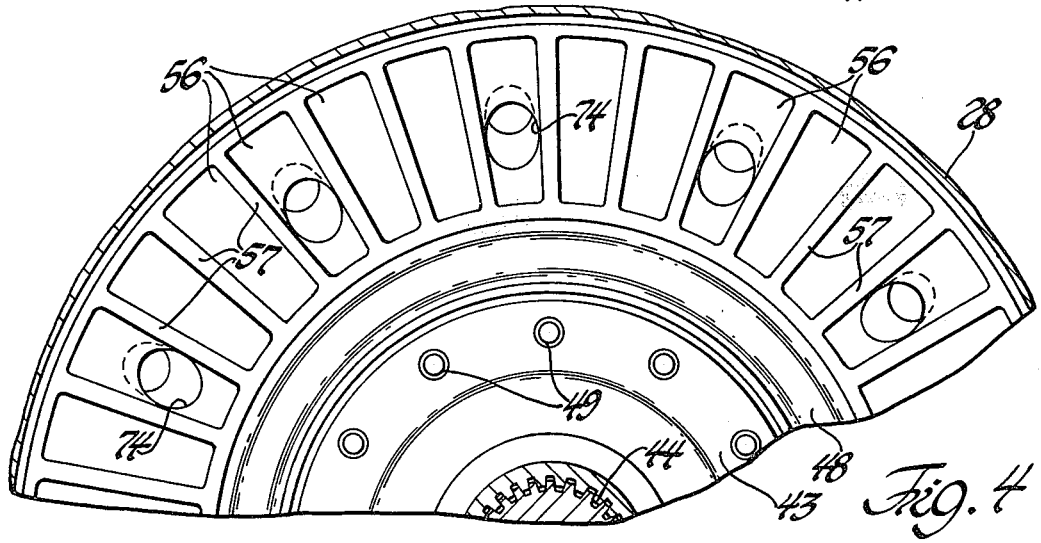

TRANSMISSION WITH RETARDER AND CONTROLS

This is a continuation of application Ser. No. 345,725, filed Mar. 28, 1973, now abandoned.

BACKGROUND OF INVENTION

Transmissions with a retarder connected to the drive train between a torque converter and multiratio power shift transmission having a control system for the torque converter, retarder and power shift transmission are known as shown in the R. M. Tuck et al. U.S. Pat. No. 2,978,928 granted Apr. 11, 1961.

SUMMARY OF THE INVENTION

This invention relates to transmissions and retarders and controls therefor.

This invention provides an improved fluid supply and control system for supplying fluid to the fluid drive or torque converter unit, the power shift gear unit and the retarder. The retarder includes improved inlet and outlet passages for pumping fluid through a retarder chamber, flow circulation passage arrangement for a dual chamber retarder, retarder control valve arrangement variably exhausting retarder inlet flow to vary retarder charging pressure and power capacity and regulator valve arrangement regulating retarder charging pressure to limit maximum retarder power capacity to transmission power capacity. The transmission control system provides a high regulated pressure supply to control the power shift gear unit and an intermediate regulated pressure supply for lubrication with overage flow from both supplies connected in series to supply and flow through the fluid drive, a cooler and to a low pressure regulator valve regulating the pressure downstream of the cooler to control fluid drive pressure. The retarder valve in the retarder off position blocks retarder inlet flow and dumps retarder outlet to exhaust and, in the retarder on position, connects the retarder outlet to join the fluid drive outlet to the cooler inlet and connects the cooler outlet in parallel to the retarder inlet, a variable exhaust restriction controlling retarder inlet pressure and capacity up to the maximum varying with speed limited by the low pressure regulator valve.

The retarder has a rotor mounted for rotation about the retarder axis and located in a stator housing. The retarder preferably has two toroidal chambers, one formed between each side of the rotor and an adjacent stator housing wall, to balance the axial thrust on the rotor and to provide high torque capacity in a small radius retarder. Each toroidal chamber is formed by a pair of coaxial annular shells having a semicircular radial cross section, the rotor shell formed in the rotor and the stator shell formed in the stator. Each pair of shells has the curved sides extending away from a central transverse plane to form the circular shell section of the toroidal chamber. Radial blades divide each shell into an annular series of pockets each having a semicircular radial cross section. These toroidal flow chambers may have any conventional circular cross section in a radial plane through the axis such as the elongated circular cross section shown providing helical toroidal flow circumferentially and radially outward in the rotor, axially to the stator, radially inward in the stator and axially to the rotor.

The inlet passage extends radially inward to the stator of the inlet chamber between an outer wall substantially in a transverse radial plane tangent to the stator shell at the widest portion of the stator shell at the widest portion of the wider stator entrance pockets and an inner wall substantially in a transverse radial plane intersecting the shell between the central plane and the outer wall and extends circumferentially over a small circumferential portion of the stator. The inlet passage is a slot like passage extending a small distance circumferentially of the stator shell of the toroidal chamber and has an opening entering several entrance stator pockets of the annular series of normal stator pockets in the axial outer portion and radially inward of the outer torus radius in an intermediate portion radially outward of the widest portion where the toroidal flow guided by the normal stator shell upstream of the entrance opening has a large radial inward component and a small axial component. The toroidal flow vector is thus substantially aligned with the inlet flow vector in the several entrance stator pockets to add the toroidal flow velocity pressure head to the inlet pressure head for efficient injection pumping action to accelerate inlet passage flow to the inlet chamber for rapid initial filling and high rate flow through the retarder chambers during retarder operation. The entrance pockets are wider than the other normal stator pockets so the outer toroidal flow vector at the shell surface guided by the normal stator shell upstream of the entrance is substantially aligned to be tangent with the mean or central inlet flow vector at the point in the entrance pocket equivalent to the widest part of the normal stator pocket. The inlet flow in the entrance stator pockets is uniformly distributed to the rotor pockets in the inlet chamber as the rotor pockets rotate past the entrance stator pockets.

Transfer passages extend through the rotor between the closely adjacent curved portions of the back to back rotor shell to transfer fluid from the inlet chamber to the other chamber. The preferred transfer passage at its inlet is tangent to a central point of the radially inner curved portion of the rotor shell of the inlet chamber where the toroidal flow vector has large or about equal axial and radial outward flow components to divide toroidal flow. The transfer passage continues axially and radially outward, preferably substantially in alignment with the toroidal flow vector at its inlet and merges with radially outward toroidal flow in the other chambers. Accelerated flow through the transfer passages is provided by the inlet chamber toroidal flow, centrifugal force in the transfer passages and injection pumping action as fluid flowing from the transfer passages merges with toroidal flow in the other chamber for substantially simultaneous filling of and equal flow through both chambers. The transfer passages are circular for ease of manufacture and substantially as large as the circumferential distance between blades to permit the use of transfer passages in a substantially reduced portion of the rotor pockets evenly spaced circumferentially for efficient transfer from the inlet chamber to the other chamber and more rapid filling of the retarder chambers.

An outlet passage is provided preferably in both stators to divert a sufficient portion of the toroidal flow from the chamber to the cooler during retarding and to the sump to quickly discontinue retarding. The outlet passage has an outlet opening extending over a small circumferential portion, a few pockets, of each stator axially aligned to receive the axial toroidal flow leaving the rotor shell and entering the stator shell. Radially within the outlet opening the outlet stator pockets have a reduced outer toric radius and a curved shape beginning at this reduced radius relative to the normal stator pockets and the same width and inner toric radius as the normal stator pockets to continue the remaining portion of the toroidal flow in a toroidal flow path to obtain full braking from this remaining portion of the toroidal flow. This outlet restrains the centrifugal head from pumping and primarily converts the toroidal flow velocity and pressure head to an outlet pressure head for pumping fluid through the outlet passage and cooler. The outlet passage must be circumferentially spaced from the inlet passage on the same stator portion. The outlet openings at each stator are preferably axially aligned portions of the outlet passage. The circumferentially small outlet opening is located sufficiently ahead or upstream of the circumferentially small inlet opening in the same stator relative to the direction of rotor rotation and toroidal flow is confined in the remaining toroidal flow chamber for maximum retarding so exhausting fluid aids entry of fluid and there is no significant back flow from the inlet to outlet. With this arrangement the inlet supplies an equal amount of oil to each rotor pocket as it passes the inlet and each rotor pocket as it passes the outlet delivers an equal amount of oil to the outlet and the cooler for uniform cooling in the toroidal chamber.

In the supply and control system, one pump and regulator valve supplies high pressure fluid to the transmission gear unit control system and another pump and regulator valve supplies intermediate pressure fluid to the lubrication system. A substantially constant volume of overage fluid from these regulator valves flows through the fluid drive, retarder valve and cooler for fluid drive operation and fluid cooling whenever the engine is running. When the retarder valve is in the retarder off position, the cooler outlet pressure is limited to a low pressure by a low pressure regulator valve with all overage flow returned to sump since flow to the retarder inlet means and through a variably restricted exhaust is blocked. The fluid drive operating pressure is higher due to the line and cooler pressure drop. Since the retarder inlet passage is blocked and the retarder chamber is exhausted through the retarder outlet passage, there is no retarding. When the retarder valve is moved toward the retarder full on position, the retarder outlet passage and the fluid drive outlet are connected to the cooler inlet and the cooler outlet is connected to the retarder inlet passage. The retarder inlet pressure is progressively increased from a minimum pressure to a maximum pressure by the retarder valve during such movement which initially opens and then progressively closes a variably restricted exhaust to sump. The maximum pressure is limited by the low pressure regulator valve connecting overage to sump. The power capacity of this retarder varies as a substantially straight line function of retarder inlet pressure and rotor speed, during the partial retarding phase, the central retarding phase between minimum and maximum retarding, since the maximum capacity permitted by the low pressure relief valve, the same as the maximum capacity of the transmission and drive train, is less than the maximum capacity of the retarder with higher inlet pressures. The retarder valve in the retarder on position connects the retarder chamber and cooler in a series loop circuit with the converter outlet or supply flow entering the loop circuit in the retarder outlet and cooler inlet passage portion at the retarder valve. The cooler outlet retarder inlet passage portion of the loop circuit is connected at the retarder valve in parallel to the variably restricted retarder capacity control exhaust and the low pressure regulator valve. The retarder valve has a recessed land with a full diameter portion closing the exhaust in the retarder off position and on movement toward the retarder on position initially provides a large opening free exhaust and progressively a more restricted exhaust and closes the variable exhaust in the retarder full on position to provide minimum to maximum retarder inlet pressure and retarder power. The partial retarder power capacity, increased by closing the restricted exhaust up to the maximum retarder power, limited by the low pressure regulator valve, increases with valve movement and with rotor speed. The retarder inlet injection pumping action provides quick partial or full filling of the retarder chamber respectively at minimum or maximum retarding. The converter outlet flow supplemented by any retarder outlet flow at the cooler inlet is always available at the cooler outlet to initially partially fill and to increase the degree of partial fill of fluid in the retarder chamber to increase partial retarder capacity due to the conjoint pumping action of the retarder inlet and outlet passages and initially opening and then progressively closing the variably restricted exhaust with retarder valve movement. Under steady state partial retarding, all converter outlet flow is exhausted through the variably restricted exhaust at the fixed setting in any retarder valve intermediate position for partial retarding. Under maximum retarding, a steady state condition, all converter inlet flow is exhausted through the low pressure regulator valve. At maximum retarding the cooler outlet is limited to a low pressure by the low pressure regulator valve. This low pressure and the retarder inlet passage and outlet passage pumping action provides the pressure head for cooling circulation in the loop circuit provided by the retarder valve through the retarder and cooler. During partial retarding, the cooler outlet pressure is proportionally reduced and the retarder pumping action is reduced proportionally to the reduced retarder capacity and the reduced cooling requirements.

These and other features of the invention will be apparent from the following drawings and description of the preferred embodiment.

BRIEF DESCRIPTION OF DRAWINGS

FIG. 1 is a sectional view of the retarder on line 1—1 of FIG. 2.

FIG. 2 is a partial sectional view with parts broken away on the line 2—2 of FIG. 1.

FIG. 3 is a partial sectional view on the line 3—3 of FIG. 1.

FIG. 4 is a partial sectional view on the line 4—4 of FIG. 1.

Figures 5, 6:
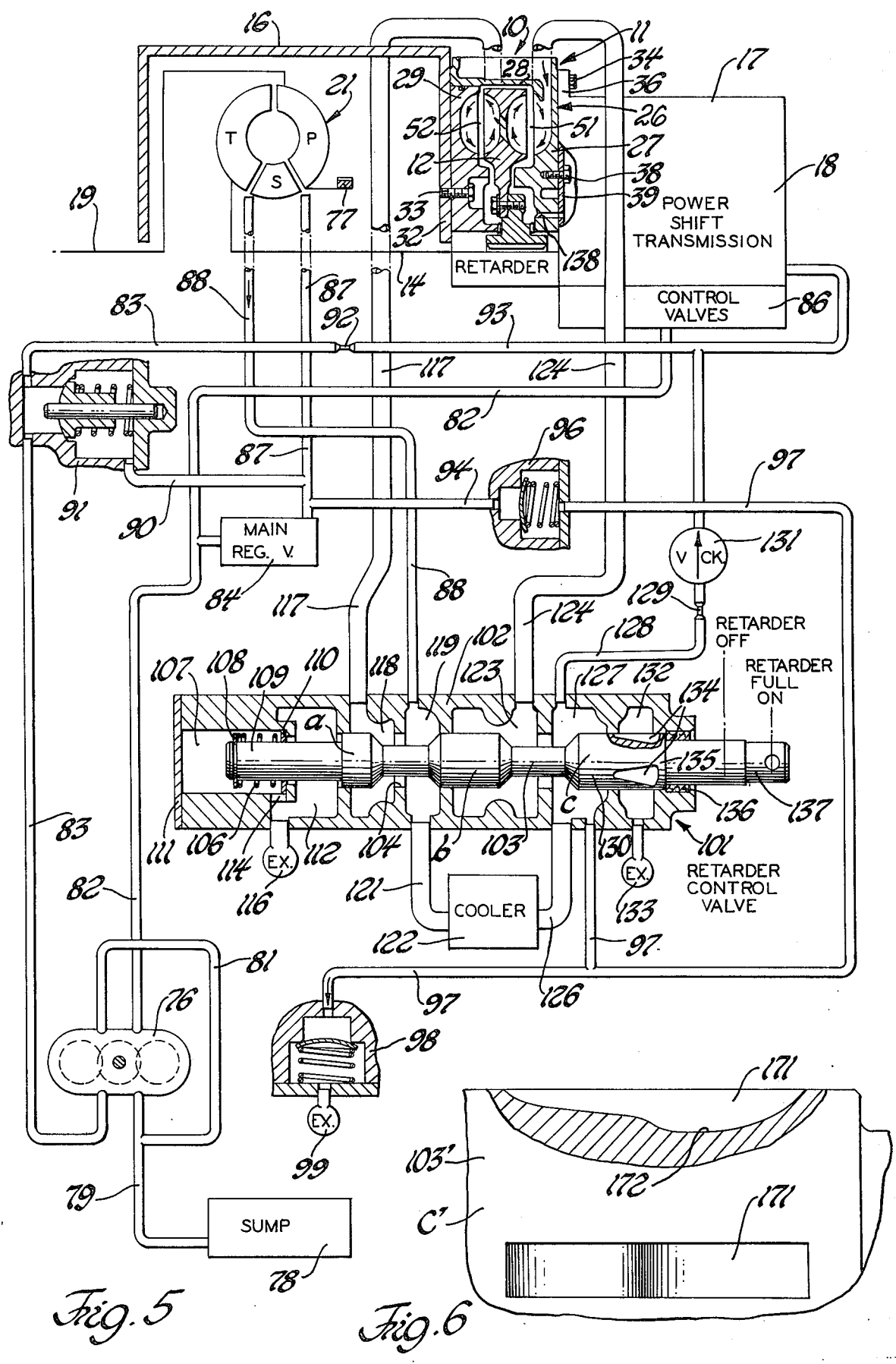
FIG. 5 is a diagrammatic view of the transmission with retarder and control system.
FIG. 6 is a partial view of a modified valve element.

Referring to the drawings, the transmission has a conventional drive train with a torque converter 21 or other fluid drive, a retarder 10 and power shift gear unit 18 arranged in series as shown in FIG. 5. The retarder 10 has a retarder stator housing 11 enclosing a rotor 12 mounted for rotation with and on shaft 14 which is suitably supported for rotation about the retarder axis 15 by bearings, not shown, with respect to the stator housing 11, as shown in detail in FIGS. 1 to 4. This retarder is a portion of the transmission assembly, FIG. 5, having a torque converter housing 16, the retarder housing 11 and the housing 17 of the power shift gear unit 18 forming a stationary transmission housing assembly. This type transmission assembly is shown in more detail in R. M. Tuck et al. U.S. Pat. No. 2,978,928 granted Apr. 11, 1961, H. W. Christenson et al. U.S. Pat. No. 3,255,642 granted June 14, 1966 and R. H. Schaefer et al. U.S. Pat. No. 3,691,872 granted Sept. 19, 1972. This transmission assembly has an improved retarder and controls. The input shaft 19 suitably supported for rotation in the torque converter housing 16 drives the pump element P of the conventional torque converter 21. The stator S provides torque multiplication. The turbine T drives the turbine shaft or retarder shaft 14 which is connected through the retarder to drive the power shift gear unit transmission 18. The retarder shaft 14 is conventionally mounted in suitable rotary bearings not shown in the torque converter and power shift transmission but may have bearings in the retarder housing.

The retarder stator housing 11 has a cup-shaped portion 26 providing integrally a rear transverse radial wall 27 and an intermediate cylindrical wall 28. The forward wall 29 is circular and is located within and sealed by seal 31 within the cylindrical wall 28. The retarder housing forward wall 29, FIGS. 1, 3 and 5, is secured to the rear wall 32 of the torque converter housing 16 by the centrally located screws 33. A plurality of outer screws 34 extend through the flange 36 of the transmission housing 17, through the cylindrical wall 28 of the retarder housing 11 and into the rear wall 32 of the torque converter housing 16 to hold the rotor housing, retarder housing and transmission housing together in the transmission assembly. Screws 37 located intermediate the radially inner and outer screws 33 and 34 also secure front retarder wall 29 to converter housing wall 32 and seal the conventional groove fluid passages not shown between these walls. Screws 38 extending through a front wall or diaphragm 39 of the transmission housing secure this wall to the retarder rear wall 27 and seal groove fluid passages such as groove passage 40.

The cylindrical wall 28 has an integrally formed valve mounting boss 41 terminating in the face 42 to which the valve body 102 is sealed. The valve mounting boss 41 is a rectangularly shaped protrusion from the cylindrical surface of wall 28 and contains the flow passages controlled by the retarder control valve 101, both described below.

The rotor 12 has a hub 43 connected by splines 44 to rotate with retarder shaft 14 and is axially positioned by the thrust bearing 46 contacting wall 27 and thrust bearing 47 contacting wall 29. The rotor has an inner annular portion 48 secured by screws 49 to the hub.

The retarder is of the dual chamber type having a first or inlet toroidal chamber 51 and a second or downstream toroidal chamber 52. The first chamber has a stator shell 53 formed in the wall 27 having radial blades 54 and a rotor shell 56 formed in the adjacent side of the rotor member 48 with radial blades 57 therein. The second chamber has a stator shell 58 formed in the wall 29 with radial blades 59 and a rotor shell 61 with radial blades 62 formed in the adjacent side of the rotor member 48. Both chambers are enclosed to confine fluid therein by cylindrical wall 28. Each shell has an annular shape about the rotor axis and a semi-circular cross section and semi-circular blades. Each toroidal chamber is formed by a stator shell and a rotor shell having, in a radial cross section in a plane containing the retarder axis, the straight radial portion of the blades facing and adjacent each other at a central transverse plane and the curved portions extending oppositely away from the central plane to provide a toroidal flow chamber having a circular cross section such as the radially elongated circular cross section as shown in FIG. 1 or other similar cross sections employed in hydrodynamic machines including a true circle and eliptical variations. In such toroidal flow chambers the rotation of the rotor pumps the fluid circumferentially about axis 15 and radially outwardly in the rotor chamber portion, axially and helically from the radially outer portion of the rotor chamber portion to the radial outer portion of the stator chamber portion without significant radial flow through the small clearance space between the rotor and stator and circumferential flow between the rotor and the wall 28 and then radially inwardly in the stator chamber portion and then axially without a helical component at the radially inner part of the chamber to the rotor chamber portion without flow through the small space between the rotor and stator due to centrifugal force, as indicated by the design or mean flow path arrows, FIG. 1, a toroidal flow path. Thus there is no flow during operation through the small space between the rotor and stator. The rotor chambers within the shells 56 and 61 extend annularly about the retarder axis and have the radially extending blades 57 and 62 dividing the rotor chamber portion into an annular series of a plurality of pockets. The stator chamber within the shells 53 and 58 are also divided by the radial blades 54 and 59 into an annular series of pockets. The stator shells are basically uniformly annular in section but may have one or more wide blades 63 as shown for the second stator shell 58 in FIG. 3 to enclose fluid passages thererin, not shown, bosses 64 for some screws 33 requiring an increase of the inner diameter of the shell which shortens a few pockets, some pockets have a slightly larger outer diameter and flat portion to accommodate the heads of screws 37 and some pockets have a threaded hole closed by screws 38. These irregularities and the irregular annular spacing of the stator blades, best shown in FIG. 3, are useful to prevent harmonic vibration and noise and do not materially modify or reduce toroidal flow.

The stator shell 53 of inlet chamber 51 is modified to provide the inlet passage opening portion 71 of retarder inlet passage 124. The stator shells 53 and 58 respectively of the inlet chamber 51 and downstream chamber 52 are modified to provide respectively the outlet passage opening portions 72 and 73 of retarder outlet passage 117. The rotor member 48 has a transfer passage provided by a plurality of transfer passage portions 74 extending from the inner portion of shell 56 radially outward and axially to the shell 61 to transfer fluid from the inlet chamber to the downstream chamber. The inlet passage 124, outlet passage 117 and transfer passage portions 74 are constructed to provide pumping action varying as a function of toroidal flow velocity and thus retarding power as described below.

The hydraulic control system, FIG. 5, is supplied with fluid by a three gear fluid supply pump 76, conventionally driven by the input driven gear 77 on the torque converter pump P. This fluid supply pump has one pump unit supplying fluid from the sump 78 and suction line 79 to the main line 82 and another pump unit supplying fluid from suction branch 81 to the lubrication line 83. The main line 82 is connected to the main regulator valve 84, a conventional regulator valve, regulating main line pressure at a high value, i.e. 165 psi, to supply main line pressure to the transmission control valves 86. The main regulator valve 84 is connected to converter inlet line 87 and delivers overage fluid from the main line to the torque converter inlet line 87 to supply fluid to the torque converter 21. The fluid fills the operating chamber of the torque converter and flows out of the torque converter operating chamber through torque converter outlet line 88. The lubrication supply line 83 is connected to the lubrication supply regulator valve 91 which regulates lubrication supply pressure at an intermediate pressure, i.e. 70 to 125 psi, and has a lubrication supply overage line 92 connected to the main regulator valve overage or converter inlet line 87. The lubrication supply regulator valve 91 provides a low pressure differential, i.e. 20 psi, between the higher pressure in the lubrication supply line 83 and the lower pressure in the main regulator valve overage or converter inlet line 87. The lubrication supply line 83 is connected through a restriction 92 to the lubrication feed line 93 which connects lubrication fluid to the lubrication system within the power shift transmission 18 having a lower pressure, i.e. 20 to 40 psi. The main regulator valve overage line is connected by a branch line 94 to the primary converter pressure regulator valve 96 and the overage is connected to the relief line 97 and provides a moderate pressure differential, i.e. 50 psi. The primary converter pressure regulator valve 97 is normally closed but limits converter inlet pressure to prevent abnormally high pressure due to high downstream restriction which may be caused by cold oil or fluid in the converter and cooler. The pressure relief line 97 is connected to the secondary converter regulator valve 98 which limits the pressure to a low value, i.e. 55 psi, and connects the overage through exhaust 99 to the sump.

The retarder control valve 101, FIG. 5, has a valve body 102 secured and sealed to the face 42 of the valve supporting and passage boss 41 shown in FIG. 2. The retarder valve 101 has a valve element 103 having equal diameter lands a, b and c reciprocally mounted in a bore 104 in the valve body 102 and is shown in the retarder full on position. The valve element 103 is manually positioned in the retarder full on position shown and biased by a spring 106 located in the enlarged spring chamber portion 107 of the bore and abutting a snap ring abutment 108 fixed on the end of stem 109 of the valve element and an abutment 110, a washer on a shoulder portion of the valve body at the inboard end of the spring chamber. The outboard end of the spring chamber is sealed by a plate 111 suitably secured to the valve body. The valve body has the following ports described in their order from the spring chamber end. Adjacent the spring chamber an exhaust port 112 suitably connected by port 114 or a space between stem 109 and shoulder 110 to the spring chamber and both connected to exhaust to sump by dump exhaust 116. The retarder outlet passage 117 is connected to the retarder outlet port 118 in the valve body which, in the retarder on position shown, is connected between lands a and b of valve element 103 to the torque converter outlet port 119. The torque converter outlet line 88 is directly connected to port 119 so both the retarder outlet and the converter outlet flows join in port 119 and are connected by the cooler inlet line 121 to the cooler 122. Next adjacent in the valve body is the retarder inlet port 123 which is connected to the retarder inlet passage 124. The cooler outlet line 126 is connected to the cooler outlet port 127 which, with valve element 103 in the retarder on position, is connected between the lands b and c to the retarder in port 123 and passage 124. The cooler outlet port 127 is also connected in parallel to the retarder inlet pressure line 97, so the secondary converter regulator valve 98 limits retarder inlet pressure to the low pressure and exhausts overage to sump. The cooler outlet line is also connected by a supplemental lubrication line 128 which has a restriction 129 therein to limit supplemental lubrication flow from the low pressure source and a one-way check valve 131 permitting flow only from the cooler outlet port 127 to the lubrication feed line 93 and preventing return flow of lubricating oil from the lubrication feed line to the retarder system. Adjacent to the cooler outlet port 127 there is a control exhaust port 132 connected by a suitable exhaust passage 133 to the sump 78. In the retarder on position the land c of valve element 103 has a full diameter portion 130 in the bore between cooler outlet port 127 and exhaust port 132 to prevent any flow to exhaust. The tapered exhaust recesses 134, or variably restricted exhaust passages, are within the exhaust port 132 and nonfunctional. The land c has a full diameter portion at both ends of recesses 134, one 130 effective in retarder on as pointed out above and one 135 effective in retarder off as pointed out below. A seal 136 in the end of bore 104 sealingly engages handle stem 137 of the valve element 103 to prevent leakage and may include a stop washer, not shown. The retarder valve 101 in the retarder on position connects the retarder 10 and cooler 122 in series, the cooler outlet 126 in parallel to the retarder inlet passage 124, the supplemental lubrication feed 128 and the low pressure regulator valve 98 which limits cooler outlet, retarder inlet and supplemental lubrication feed pressures to a low value, i.e. 55 psi. The overage supply in the converter inlet line 87 is connected in series through the converter 21 and joins retarder outlet passage 117 so both flow through the cooler 122. Since retarder full on is a steady state condition in which the amount of fluid in the retarder chambers is not materially changed, the amount of flow from overage line 87, added to the retarder cooler series or loop circuit upstream of the cooler is exhausted to sump downstream of the cooler by low pressure relief valve 98.

If the operator relaxes the manual force holding valve element 103 in the retarder full on position shown, the spring 106 will move the valve element to the normal retarder off position indicated by the dot-dash line. In the retarder off position the land a moves out of the bore between retarder outlet port 118 and exhaust port 112 providing a full flow connection from the retarder outlet passage 117 to retarder outlet port 118 and between lands a and b to the dump exhaust port 112 and line 116 to sump. This is a low restriction or unrestricted flow path for fast dumping of the retarder chambers. In the retarder off position the land b engages the bore at both sides of torque converter outlet port 119 so that torque converter outlet flow line 88 is connected only to cooler inlet line 121 and is disconnected from retarder outlet flow in the retarder outlet port 118.

In both the retarder off and the retarder on positions land b of valve element 103 is in the bore between converter outlet port 119 and retarder inlet port 123 so there is never any flow from the converter outlet or retarder outlet directly to retarder inlet but only through the cooler to retarder inlet or sump. Also the full diameter portion 130 of land c enters the bore between cooler outlet port 127 and retarder inlet port 123 to prevent any supply flow from the cooler via the cooler outlet line 126 and port 127 to the retarder inlet passage 124. In the retarder off position the land c is positioned so that the full diameter portion 135 of land c is in bore 104 between cooler outlet port 127 and control exhaust port 132 to prevent flow to exhaust 133, so the recesses 134 are nonfunctional. Thus the overage supply to the converter inlet line 87 is connected in series by the retarder valve 101 through the converter 21 and cooler 122 and then in parallel to the supplemental lubrication line 128 to supply supplemental lubrication and to the pressure relief line and low pressure relief valve 98 to limit cooler out pressure at the low pressure, i.e. 55 psi, and return the remaining flow to sump. An atmospheric vent 138 is provided in the retarder housing portion near the axis where there is no fluid due to the centrifugal action during the retarder operation and is connected to atmosphere in the upper portion of the transmission housing so the retarder pumping action quickly dumps fluid from the retarder chambers in the retarder off position of the retarder valve.

On initial movement of the retarder valve element 103 from the retarder off position to a minimum retarding position, land a closes the connection from retarder outlet port 118 to exhaust port 112 and land b opens a connection from the retarder outlet port 118 to the converter outlet port 119, so outlet flow joins any retarder outlet flow in converter outlet and cooler inlet port 119 for flow through the cooler inlet line 121, cooler 122 and cooler outlet line 126 to the cooler outlet port 127. The cooler outlet port 127 is connected between lands b and c to the retarder inlet port 123 and passage 124 to complete a loop circuit from the retarder chambers 51, 52 through an outlet passage provided by retarder outlet passage 117 and cooler inlet passage 121, the cooler 122 and inlet passage provided by the cooler outlet passage 126 and retarder inlet passage 124 for return to the chambers with loop circuit flow by retarder pumping proportional to toric flow velocity through the cooler restriction as the other portions of the loop circuit do not have significant restriction. During initial movement to minimum retarding position retarder inlet pressure has a minimum low value, zero or almost zero, i.e. 2 psi, since the recesses 134 provide the largest opening or least restriction of flow to control exhaust 133 and the retarder pumping action circulates flow through the retarder cooler series circuit. There is no supplemental lubrication flow as the lubrication pressure is higher and closes check valve 131. Regulator valve 98 remains closed until retarder inlet pressure rises to the maximum low pressure value for full retarding, i.e. 55 psi. On initial movement from the retarder off position to the minimum retarding position the above change of connections are substantially simultaneous, but preferably the retarder outlet port 118 is blocked from exhaust 116 and connected to converter outlet port 119 and the recesses 134 positioned to provide the largest opening to exhaust 133, before the connection from cooler outlet port 127 to retarder inlet port 123 is open to insure proper initial minimum retarding.

As the valve element 103 is gradually moved from the minimum retarding position to retarder full on position, the retarder operating range, the loop circuit remains the same without significant change of restriction and the tapered recesses 134 gradually close the restriction between the cooler outlet port 127 and exhaust port 132 so that more fluid at a higher pressure flows to the retarder to increase retarder fill and power capacity. The recesses 134, as shown in FIG. 5, are formed as a straight tapered flat cut in the cylindrical land and thus provide an exhaust passage area, the cross section area, diminishing in two dimensions, a related product curve, or exponentially similar to a curve having an exponent greater than one but not more than two with retarder valve movement. Since the typical gear pump provides flow volume varying as a function of speed, retarder inlet pressure varies as a function of speed and retarder power capacity varies as a function of inlet pressure and speed, the retarder power capacity increases at a high exponential rate with increasing area of the variable restriction exhaust control and with rotor speed. The inlet pressure range is limited to a maximum pressure to use less than the full power capacity of the retarder so the substantially straight increasing slope line initial portion with some steeper rise portion approaching maximum capacity of the high exponentially increasing power capacity curve, a positive exponential curve increasing at an increasing rate, with increasing speed at each inlet pressure value is used. Thus substantially over half the capacity curve is used but the very steeply rising terminal or maximum capacity portion is not used by limiting maximum inlet pressure and thus the degree of retarder chamber fill and power capacity. The tapered recess 134 has an exhaust area decreasing at a lower exponential rate relative to the high exponentially increasing power capacity curve. Relative to constant valve movement or equal increments of valve movement from a minimum retarding position, increasing retarding through a range of partial retarding positions to full retarding position, the area of this recess diminishing in two dimensions decreases at a negative decreasing rate so the area curve initially decreases at a negative lower exponential rate and as the rate decreases mainly approaches a straight line. This increases inlet pressure at an inversely relative to the area function, positive exponential rate so the pressure curve initially increases at a lower positive exponential rate and as the rate decreases mainly approaches a straight line, or an exponentially reduced increasing exponential rate which so the pressure curve initially increases at a lower positive exponential rate and as the rate exponentially decreases approaches a straight line and then a little reverse curvature may be approximately a straight line or have a little rising curvature with valve movement so the control valve compensates for some or all exponential increase of retarder power capacity with speed and normal valve movement increasing port area as a linear function so retarder power capacity increases at each speed value at a moderately increasing rate or substantially a straight line function through the power capacity range with valve movement, particularly the partial power capacity range between minimum and full retarding, and has a moderate increase with speed. The modified slot recesses 171 in land c' of modified valve element 103', FIG. 6 have parallel side walls and a contoured base 172 calculated to provide an exhaust passage area diminishing at a higher negative exponential rate or an inverse of the above higher positive exponential rate. Thus the exhaust passage area of modified slot recesses 171 is larger for minimum retarding, initially decreases at a higher rate, as compared to recess 134 and then at a lower rate with valve movement. This provides an exponential increasing reduction of the positive exponential increase of inlet pressure and power capacity increasing as a straight line function of valve movement. This arrangement permits higher inlet pressure to use more of the maximum available retarder capacity. The restriction closes and increases retarder inlet pressure as an inverse exponential function increasing with minimum to full retarding valve movement, relative to the directly exponential increase of power capacity with speed, so retarder power capacity varies as a straighter or straight line function of valve movement.

The structural features of the lines or passages to and from the retarder valve 101, particularly the retarder inlet passage 124 and outlet passage 117 providing the retarder pumping action, are shown in the valve mounting boss 41, FIG. 2. The dump exhaust passage 116 has an enlarged portion 141 directly connected to dump exhaust port 112 at the face 42 providing a large flow volume exhaust for quick emptying of the retarder chambers to reduce capacity. The retarder outlet passage 117 begins at the outlet passage opening portions or ports 72 and 73 and immediately enters a large chamber portion 142 extending completely across the retarder housing 11 and turns to follow the perimeter of the housing. The streamlined guide 143 in chamber 142 changes the direction of flow into the curved portion 144 which terminates at opening 145 connected to port 118 in the valve body. At the outlet port 72, the first stator shell 53 has a circular dividing edge portion 147 extending circumferentially for the circumferential length of the outlet port 72 or about one tenth or one twelfth of the circumference and has a smaller toric radius than the normal outer toric radius of the shell. The dividing edge is substantially at the central plane. The axial toroidal flow from the rotor shell 56 to the stator impinges on this edge which divides the toroidal flow so that a portion continues in the curved toroidal flow path in the outlet stator pockets 148 within edge 147 having a reduced outer torus radius and a full width compared to the normal stator pockets in chamber 51 to provide retarding and a portion is turned in the similarly curved faired port portion 146 of outlet port 72 to provide retarding and enter the portion 142 of outlet passage 124 converting toroidal flow velocity head to outlet flow pressure head. Thus full retarding capacity at the outlet and outlet pockets as compared to the normal pockets is maintained. At the outlet port 73, the shell 58 has a similar dividing edge portion 151 having a reduced toric radius compared to the toric radius of the main shell portion. The dividing edge 151 similarly divides the toroidal flow from the rotor shell 61 into a portion which continues in the toroidal flow path in the reduced radius pockets 152 of the stator and a portion entering through curved port portion 156 of port 73 to the outlet passage 117. This structural arrangement provides outlet flow or pumping action essentially varying as a function of the velocity head of the toroidal flow in the chambers and the centrifugal pressure head of the fluid in the chambers is restrained from causing pumping. Thus outlet flow is substantially proportional to the power being absorbed by the retarder.

The converter outlet line 88 and the cooler inlet passage 121 are connected, FIG. 3, to passage portion 158 connected to converter outlet and cooler inlet port 119.

The retarder inlet passage 124 as structurally shown in FIGS. 1 and 2, has a large entrance portion 161 at face 42 extending across the valve boss 41 and longitudinally on both sides of bolt boss 162 and connects to the inlet port opening portion 71 in the stator wall 27 to the wider inlet pocket portion 163 of stator shell 53. The inlet pocket portion 163 of stator shell 53 extends circumferentially one tenth or twelfth of the circumference and in this example includes three pockets which are axially wider and have the same inner and outer toric radius as the other pockets. The inlet port 71 has a planar or flat radial transverse outer wall 164 tangent to pocket portion 163 of shell 54 at its axially widest portion in the radially central region of the shell. The central radial transverse wall 165 of the inlet port 71 is intermediate the wall and the opposite edge of the shell 53 at the center of the chamber 54 and curves for flow fairing from passage portion 161 and terminates in a radial flat portion entering the shell at a point within the outermost diameter of the toric radius of the shell and radially outside the toric center of the shell section or centrally in the entrance half of the stator shell. These axially spaced transverse radial walls 164, 165 are axially equidistant from the widest portion of shell 53 of the normal stator pockets 54 as shown in FIG. 1, so the mean or central inlet flow vector merges tangentially with the outer toroidal flow vector at the surface of stator shell 53 where velocity is highest. The inner inlet pocket portion 166 within the widest central portion curves similar to the other or normal pockets and merges with the normal stator pocket shell at the inner toric radius. The radially outer inlet pocket portion 167, between the central plane and adjacent transverse wall 165 has about the same or more curvature than the other or normal pockets in this portion so the toroidal flow has a flow vector with a large radial inward component. The inlet flow thus enters the inlet pocket portion 163 of the stator of the toroidal chamber at a point within the outermost toric diameter of the shell so that the centrifugal pressure head is at an intermediate value and the toroidal flow in the chamber has changed from axial flow to have a substantial radially inward flow component with little reduction from the maximum velocity as toroidal flow leaves the rotor and enters the stator to merge with the inlet flow. This inlet structure directs the outer high velocity toroidal flow along the central axis of the inlet flow at the point of tangency in the inlet stator pockets in the shell to add the velocity pressure head of the toroidal flow to the inlet pressure head for efficient injection pumping action of the fluid into the retarder proportional to toroidal flow. The cooler inlet and outlet passages 121 and 126 have a large faired section to offer minimum resistance to flow but do not have excessive volume to delay control changes such as filling. The cooler outlet passage 126 has a portion 169 at valve face 42 connecting it to the cooler outlet port 127. The retarder inlet pressure limiting line 97 and the supplemental lubrication feed line 128 are also shown diagrammatically connected to the cooler out port 127 but it will be appreciated that they may be connected through each other if the line pressure drop is sufficiently low or both connected directly to the cooler out line 126 since this line has a high flow capacity with low pressure drop.

OPERATION

During all phases of operation when the input shaft 19 is being driven, the pump 76 provides the main line pressure in main line 82 which is regulated at a high value, i.e. 165 psi, by the main regulator valve 84 and connected to the transmission control valve unit 86 to provide the fluid under pressure for controlling the power shift transmission 18. Pump 76 also provides a second fluid pressure supply in the lubrication supply line 83 which is regulated at an intermediate pressure, i.e. 70 to 125 psi, by the lubrication regulator valve 91 which provides a low pressure differential, i.e. 20 psi. The lubrication supply line 83 is connected through restriction 92 to lubrication line 93 at a lower lubrication pressure, i.e. 20 to 40 psi. The main regulator valve overage and the lube regulator valve overage are connected to the converter inlet line 87 to supply fluid to the torque converter operating chamber in an intermediate pressure range, i.e. 60 to 105 psi, depending on the pressure in the cooler outlet port 127 which increases during retarder operation with increasing retarder inlet pressure from a minimum low pressure, i.e. 2 psi to a maximum low pressure, i.e. 55 psi.

With the retarder valve 101 in the retarder off position, the converter inlet supply in converter inlet 87 flows in series through the converter operating chamber to the converter operating chamber to the converter outlet line 88 which is connected through the converter outlet port 119 of the retarder valve to the cooler inlet line 121 and cooler 122. This full converter flow volume flows out of the cooler in cooler outlet line 126 to cooler out port 127 and in parallel to the supplemental lubrication line 128 and relief line 97 which is maintained at a low pressure, i.e. 55 psi and returns the remaining flow to sump. Thus with the retarder off, the secondary converter pressure regulator valve regulates the converter operating chamber pressure by a value, i.e. 112 psi due to the system pressure drop, largely the pressure drop in the cooler 122. When the cooler outlet pressure is above the lubrication pressure as in normal retarder off operation there is supplemental lubrication flow in line 128.

During retarder off operation, the retarder out passage 117 is connected through ports 118 and 112 to the retarder dump exhaust 116. Flow through the retarder in passage 124 is blocked and air is admitted to the retarder chambers 51, 52 through the atmospheric vent 138 so that low pressure in the chambers does not slow dumping of the retarder chambers by the pumping action of outlet passage 117.

When there is an abnormal downstream restriction in the converter and cooler circuit due, for example, to cold oil in the converter and cooler causing the pressure to rise in the converter inlet line 87 the pressure is limited at an intermediate value, 52 to 105 psi as the cooler outlet pressure varies from minimum to maximum i.e. 2 to 55 psi. The primary converter regulator valve 95 provides a differential pressure of an intermediate value, i.e. 50 psi, to the primary regulator valve overage line 96 which is connected to relief line 97 and relieved at 55 psi by connecting the flow to sump. The normal converter cooler system pressure drop is less than the differential pressure of the primary converter regulator valve so it is normally closed in both retarder off, retarder on and partial retarding positions. The full diameter portion 135 of land c of retarder valve element 103 closes the connection from cooler outlet line 126 to controlled exhaust 133.

When the retarder valve 103 is moved a small initial distance from the retarder off position to the minimum retarder capacity position, the retarder outlet passage 117 and its port 118 are disconnected by land a from exhaust port 112 and dump exhaust 116 and are connected to converter outlet port 119 to join the converter outlet flow in converter outlet line 88 directly to the cooler inlet line 121 and cooler 122. Also, at the same time, retarder valve 103 positions the largest portion of recess 134 to provide a connection between cooler out port 127 and control exhaust port 132 to provide minimum restriction to exhaust and thus the minimum cooler outlet and retarder inlet pressure. Then, when these conditions are established the cooler outlet port 127 is connected to the retarder inlet port 123 so the full converter out flow in the cooler outlet line flows to the retarder in the retarder inlet passage 124 to establish the loop circuit. The pressure reduction due to the variable restriction exhaust recesses 133 and the pressure reduction by induction pumping at the retarder inlet 71 reduces the retarder inlet pressure in the cooler outlet line 126 to a minimum low value, i.e. 2 psi to provide a larger pressure drop through the converter and cooler system increasing flow for rapid filling of the retarder chambers. Continued movement of the retarder control valve element 103 toward the retarder full on position or movement throughout the retarder on range does not change the loop circuit restriction but does move the recesses 134 relative to the cooler outlet port 127 and control exhaust port 132 to reduce the passage therebetween and thus increase restriction to exhaust flow from the retarder inlet passage to exhaust so that the supply pressure from the cooler out line 126 to the retarder inlet passage 124 increases and accordingly increases filling speed and the power capacity of the retarder. During this partial retarder operating phase after the retarder operating chambers are partially filled, steady state partial retarding is established and the entire converter supply flow supplied via converter outlet line 88, the cooler and cooler outlet line 126 is exhausted through the recesses 134 to the control exhaust port 132 and line 133. When the restriction provided by the recesses 134 is reduced sufficiently or completely closed, by full diameter portion 130 entering the bore, full capacity retarder operation is provided. Then the pressure in the cooler outlet port 127 which is supplied to the retarder is limited at a maximum low value, i.e. 55 psi, by the secondary converter pressure regulator valve 98 to limit capacity.

During partial and full retarding or throughout the retarder on range of positions of the retarder valve, the pumping action of the retarder inlet and outlet passages provide quick filling and dumping of fluid to and from the retarder chamber for quick response to the retarder valve control. This pumping action at both the inlet and outlet, varying as a function of toroidal flow velocity, provides the necessary pressure differential to provide flow through the loop circuit which includes the cooler which is sufficient and increases as a function of the power being absorbed and thus the heat that must be dissipated by the cooler to cool the retarder. The outlet port construction divides toroidal flow as a function of toroidal flow and power absorbed to increase cooling flow and cooling as a function of toroidal flow and power absorbed. Since the outlet has an inlet portion located in the radially external axially directed portion of said toroidal flow path parallel to said axis in the region of high velocity so the axial portion of toroidal flow is directed toward the inlet portion and then turns to a portion that is radial and aligned with the transverse central planes of the chambers, the helical toroidal flow circular velocityy head component in an axial plane containing the axis is converted to pressure head and the peripheral velocity component in the transverse central plane provides retarding so outlet flow does not cause a loss of retarding capacity. The variable exhaust control of retarder inlet pressure accurately controls retarder power capacity due to the toroidal flow pumping action of the retarder to the constant restriction of the cooler.

The torque converter is designed to provide full design power capacity of the power train at the pressure regulated by the secondary converter pressure regulator valve plus the system restriction of the torque converter and cooler system and particularly these two elements. The retarder, or preferably the retarder plus the engine, is designed to provide the same maximum retarding power capacity when the inlet pressure has the same maximum low value, i.e. 55 psi. Thus the same source may be employed to supply fluid to the torque converter system and the retarder system in conjunction with the same cooler to provide the maximum design power capacity.

The examples of regulated pressures given above assume, except for the converter cooler system, that the line pressure drop is not significant, the preferred construction, but it will be appreciated that they may be modified to accommodate for line pressure drop. The outer toric radius and the inner toric radius are conventionally the radii from the central axis of rotation 15 respectively to the outer and the inner portion of the retarder toric flow chambers or the shells defining these chambers or the toroidal flow path therein. The outer section radius, variable in a non-circular toric section, is conventionally the radius from the section center to the shell surface or the perimeter or outermost portion of the toroidal flow path section. It will also be appreciated that this preferred embodiment of the invention may be modified.

What is claimed is:

1. In a retarder; a stator housing; a rotor mounted for rotation in said stator housing for rotation about an axis; toroidal flow chamber means having a bladed stator shell having an inlet end and an outlet end on said stator housing and a bladed rotor shell on said rotor providing a toroidal flow chamber having an outer toroidal surface provided by said stator and rotor shells at their normal outer toroidal section radius and perimeter; said rotor circulating fluid during rotation in a toroidal flow path through said rotor shell, to said stator shell at highest velocity and through said stator shell to said rotor shell in said toroidal flow path; said stator shell having circumferentially small inlet flow means having an inlet stator shell portion having inlet and outlet end perimeter portions having substantially the same toroidal section radius as like portions of said stator shell and an intermediate perimeter portion between said end perimeter portions having a larger toroidal section radius than the like portion of said stator shell and inlet passage portion means connected to said intermediate perimeter portion of said inlet stator shell portion for merging inlet flow with the high velocity toroidal flow in said inlet end perimeter portion between said inlet end perimeter portion and a central portion of said inlet stator shell portion with the central inlet flow path vector tangent to the outer toroidal section perimeter of said stator shell and the outer high speed flow vector of the toroidal flow path for merging inlet flow with the high velocity toroidal flow in said inlet end perimeter portion of said inlet stator shell portion for injection pumping action and outlet flow means for outlet flow from said chamber.

2. In a retarder; a stator housing; a rotor mounted for rotation in said stator housing for rotation about an axis; toroidal flow chamber means having a bladed stator shell having a substantially uniform normal outer and inner toric radii and normal maximum axial width on said stator housing and a bladed rotor shell on said rotor circulating fluid in a toroidal flow path defined by section radius of said stator and rotor shells both having the same toric section radius at the normal outer toric radius and flowing in a toroidal flow path having an axial flow path at highest velocity from said rotor shell to said stator shell in the outer radial portion of the flow chamber means and through said stator shell to said rotor shell in said toroidal flow path; said stator shell havving inlet flow means for inlet flow and outlet flow means having a dividing edge located within said normal outer toric radius and extending only over a small portion of the circumference of said stator shell dividing toroidal flow in the axial flow path into outlet flow and continuing toroidal flow in the stator, outlet passage means between said dividing edge and said normal outer toric radius of said stator shell extending over only substantially the same small portion of the circumference receiving said outlet flow and an outlet shell portion radially within said dividing edge receiving said continuing toroidal flow and having a reduced outer toric radius and having a maximum axial width and inner toric radius relative to said stator shell so retarding power capacity of said continuing toroidal flow is not reduced and said dividing edge therebetween being in the highest velocity axial flow path of said toroidal flow as the fluid leaves said rotor portion and enters said stator portion dividing toroidal flow so a portion becomes outlet flow and impacts in said outlet passage means converting toroidal flow velocity head to outlet pressure head with minimal centrifugal pressure head and absorbing power and a portion continues in said outlet stator shell portion in said toroidal flow path to absorb power so outlet flow is a function of toroidal flow and the power absorbed and the total power absorbed in said outlet flow means is not reduced relative to the power absorbed in a like circumferential portion of said stator shell.

3. In a retarder; a stator housing; a rotor mounted for rotation in said stator housing for rotation about an axis; toroidal flow chamber means having a bladed stator shell having an entrance portion, an exit portion, an outer, central and inner toric radius, a toric section perimeter and an axial width on said stator housing and a bladed rotor shell on said rotor forming a toric chamber and circulating fluid in said toric chamber in a toroidal flow path having an axial flow path from said rotor shell to said entrance portion of said stator shell and through said stator shell to said exit portion and to said rotor shell in said toroidal flow path and enclosed by said stator housing to prevent significant radial outward flow between said stator and rotor shells; said stator shell having inlet flow means in only a small circumferential portion of said stator shell having an inlet stator shell portion and inlet passage means merging with said inlet stator shell portion between said entrance portion and said central toric radius with a central inlet flow path tangent to the toroidal flow path at the outer toric section radius of said toric section perimeter of said stator shell and merging with the toroidal flow for injection pumping action and outlet flow means in only a small circumferential portion of said stator shell closely upstream of said inlet flow means relative to toroidal flow having outlet passage means in the radially outer portion of said stator shell, an outlet stator shell portion in the radially inner portion of said stator shell having an axial width and inner toric radius similar to said stator shell and a circumferentially extending dividing edge therebetween in said entrance portion of said stator shell in the axial flow path of said toroidal flow as the fluid leaves said rotor shell and enters said stator shell entrance portion dividing toroidal flow so a portion impacts in said outlet passage means converting toroidal flow velocity head to outlet pressure head with minimal centrifugal pressure head and absorbs power and a portion continues in said outlet stator shell portion in said toroidal flow path and absorbs power so outlet flow is a function of toroidal flow and the total power absorbed is substantially the same as an equal circumferential portion of said stator shell.

4. The invention defined in claim 3 and control means to supply fluid at a controlled pressure to said inlet flow means including a manual member moved from a minimum retarding position through a range of partial retarding positions to full retarding position for varying the pressure supplied to said inlet flow means with member position from a minimum pressure value to a maximum pressure value; a restriction; said inlet flow means providing inlet pumping flow volume and said outlet flow means connected through said restriction to said inlet flow means and providing outlet pumping flow volume to increase the volume of fluid in said toroidal chamber to increase retarder power as a function of inlet pressure in a substantially straight line relation to manual member position in a substantial portion of the partial retarding range and to increase outlet flow volume as a function of toroidal flow and power being absorbed.

5. The invention in claim 3 and said toroidal flow chamber means including an inlet chamber and a downstream chamber each having a bladed stator shell and a bladed rotor shell; said inlet flow means being connected to said inlet chamber; said bladed rotor shells being in back to back relation; one of said outlet flow means having said outlet passage means, said outlet shell portion and said dividing edge on the stator in each chamber; transfer passage means including a passage extending radially outward and axially from the radially inner curved portion of said rotor shell of said inlet chamber in alignment with the toroidal flow at said radially inner curved portion and merging in the radially outer portion of the bladed rotor shell of said downstream chamber providing pumping action due to inlet chamber toroidal flow velocity, centrifugal force and injection pumping at the downstream chamber and dividing inlet chamber toroidal flow substantially equally into flow to the downstream chamber and continuing inlet chamber toroidal flow for simultaneous filling and equal flow to the outlet flow means for each chamber for cooling both chambers during operation.

6. In a retarder; a stator housing; a rotor mounted for rotation in said stator housing for rotation about an axis; toroidal flow chamber means having a bladed stator shell having an entrance end, an exit end, an outer, a central and an inner toric radius and a toric section perimeter with a toric section radius on said stator housing and a bladed rotor shell on said rotor circulating fluid in a toroidal flow path having an axial flow path from said rotor shell to said entrance end of said stator shell and through said stator shell to said stator exit end and to said rotor shell in said toroidal flow path; said stator shell having inlet flow means in a small circumferential portion of said stator shell having an inlet shell portion having an entrance portion having a toric section perimeter curving radially inwardly like the same portion of the toric section perimeter of said stator shell and being axially wider than said stator shell in a toric radially central portion and inlet passage means extending radially inward between transverse planes with a central flow path tangent to the toroidal flow path at the outer toric section radius of said stator shell as said toroidal flow path is at the axially widest point of said stator shell for merging inlet flow with the toroidal flow in the outer inlet shell portion between the central toric radius and entrance portion for injection pumping action and outlet flow means in a small circumferential portion of said stator shell having outlet passage means, an outlet shell portion radially within said outlet passage means and having substantially the same axial width and inner toric radius as said stator shell to avoid loss of retarder capacity and a dividing edge therebetween at said entrance end in the axial path of said toroidal flow as the fluid leaves said rotor portion and enters said stator portion dividing toroidal flow impacting on said edge so a portion impacts in said outlet passage means converting toroidal flow velocity head to outlet pressure head with minimal centrifugal pressure head and to absorb power and a portion continues in said outlet shell portion in said toroidal flow path to absorb power so outlet flow is a function of toroidal flow and the power absorbing capacity and full power, as in a like circumferential portion of said stator shell, is absorbed in said outlet flow means.

7. The invention defined in claim 6 means to supply fluid at a controlled pressure to said inlet flow means including a manual member moved from a minimum retarding position through a range of partial retarding positions to full retarding position for varying the pressure supplied to said inlet flow means from a minimum pressure value to a maximum pressure value; said inlet flow means providing inlet pumping flow volume and said outlet flow means having a restriction and providing outlet pumping flow volume to increase the volume of fluid in said toroidal chamber to increase retarder capacity as a function of inlet pressure in a substantially straight line relation to manual member movement in a substantial portion of the partial retarding range and to increase outlet flow volume as a function of toroidal flow and power being absorbed.

8. The invention defined in claim 7 and said inlet flow means and said outlet flow means extending circumferentially over a small portion of the circumference of said chamber and said outlet flow means being closely spaced circumferentially ahead of said inlet flow means relative to toroidal flow and rotor rotation and the rotor during rotation in the normal retarding direction first ejecting a portion of the fluid to said outlet flow means and then said toroidal flow injecting fluid from said inlet flow means to the toroidal flow path to replace the ejected fluid.

9. The invention defined in claim 8 and said stator housing having a passage and valve boss on one side extending over said inlet and outlet passage means having a flat valve face, a control valve having one movable valve element secured on said flat valve face and said inlet passage means and outlet passage means extending from said toroidal chamber through said boss to said flat valve face and said control valve having one movable valve element controlling inlet and outlet flow.

10. In a retarder; a stator housing; a rotor mounted for rotation in said stator housing about an axis; a toroidal flow chamber between said rotor and stator housing; said chamber having an annular bladed stator portion on the stator housing and an annular bladed rotor portion on the adjacent side of said rotor both coaxial with said axis and having a semicircular cross section having an outer radius, an inner radius and an axial width and each located on an opposite side of a central plane transverse to the axis with the curved portion extending away from said central plane; said stator housing enclosing said chamber to prevent significant radial outward flow between said bladed stator portion and bladed rotor portion; said rotor portion during rotation of the rotor with fluid in the chamber circulating fluid in a toroidal flow path extending radially outwardly in said rotor portion, axially from said rotor portion to said stator portion at the radial outer part of said stator portion, radially inward in said stator portion and axially to said rotor portion at the inner toric radius providing the toroidal helical flow path; inlet passage means for supply of fluid to said chamber; and said chamber having outlet passage means having an outlet opening at the radial outer part of said stator portion and a similarly curved smaller semicircular outlet stator portion radially within said outlet opening having a smaller outer radius and substantially the same inner radius and axial width as the semicircular cross section of said stator portion to avoid loss of retarding capacity and both extending over only a small portion of the circumference of the chamber to convert in the stator portion the velocity pressure head of a portion of the toroidal flow in said chamber after moving from the rotor portion to the stator portion to outlet flow and pressure head and to provide retarding in the outlet opening and to retain a portion of the toroidal flow in the outlet stator portion in the toroidal flow path providing retarding so the outlet passage means provides substantially the same retarding as an equal circumferential portion of said stator portion.

11. In a retarder; a stator housing; a rotor mounted for rotation in said stator housing about an axis; a toroidal flow chamber between said rotor and stator housing; said chamber having an annular bladed stator portion on the stator housing and an annular bladed rotor portion on the adjacent side of said rotor; both said stator portion and rotor portion being coaxial with said axis, and having a curved cross section shell defining the surface of said chamber having an equal outer toric radius, an equal inner toric radius and an axial width and each located on an opposite side of a central plane transverse to the axis with the curved cross section shell extending away from said central plane; said rotor portion during rotation of the rotor with fluid in the chamber circulating fluid in a toroidal flow path extending radially outwardly in said rotor portion, axially from said rotor portion to said stator portion, radially inward in said stator portion and axially from said stator portion to said rotor portion in the toroidal flow path; inlet passage means extending radially inwardly to said stator portion having one radial transverse wall portion axially beyond the tangent to the central axially widest portion of said stator shell and another radial transverse wall intermediate said tangent and said central plane intersecting said stator shell at an intersection radius centrally between the radial center and outer toric radius and both walls extending over a small circular portion of the chamber providing an inlet stator shell portion having a curved portion between said central plane and said another wall like the same curved portion of said stator shell and a wider portion defined by said one wall from said intersection radius to the radius of the central axially widest portion of said stator shell and a portion merging to the same inner toric radius as said stator shell for inlet flow merging radially outward of the central axially widest portion of said stator shell at an intermediate pressure and substantially aligned with the central inlet flow vector tangent to the high speed toroidal flow path vector at the stator shell at the central axially widest portion to add the toroidal flow velocity pressure head to the inlet pressure head for injection pumping of fluid into said chamber; and said chamber having outlet passage means in said stator portion having a dividing edge extending circularly radially within said outer toric radius substantially at said central plane, an outlet opening at the radial outer part of said stator portion between said dividing edge and outer toric radius curving in a radial outward direction and curved smaller outlet shells radially within said dividing edge and said outlet opening having a smaller outer radius and substantially the same axial width and inner toric radius as said stator shell to avoid loss of retarding capacity and extending over another small circular portion of the chamber to convert the velocity pressure head of a portion of the toroidal flow in each chamber moving axially from the rotor portion to the stator portion to outlet flow and pressure head and provide retarding in the outlet passage and to retain a portion of the toroidal flow in said outlet shell in the toroidal flow path to provide retarding so the total retarding in said outlet passage means is substantially equal to the retarding of an equal circular portion of said stator shell.

12. In a retarder; a stator housing; a rotor mounted for rotation in said stator housing about an axis; said stator housing having an end wall on each side of said rotor and an intermediate axial peripheral wall enclosing said rotor; a first toroidal flow chamber between one end wall and one side of said rotor; a second toroidal flow chamber between the other end wall and the other side of said rotor; each chamber having an annular bladed stator portion having an entrance end and located on an end wall and an annular bladed rotor portion on the adjacent side of said rotor both coaxial with said axis, said stator portions and said rotor portions having a semi-circular cross section and each adjacent pair of stator and rotor portions located on opposite sides of a central plane transverse to the axis with the curved portion extending away from said central plane to form a chamber; said stator housing enclosing said chamber to prevent significant radial outward flow between said bladed stator portion and said bladed rotor portion of each chamber; said rotor portion during rotation of the rotor with fluid in the chamber circulating fluid in a toroidal flow path radially, outwardly and circumferentially in said rotor portion, axially from said rotor portion to said entrance end of said stator portion, radially inward in said stator portion and axially to said rotor in a toroidal helical flow path; inlet passage means for supplying fluid to said first chamber; a straight transfer passage extending radially outward and axially from and tangent to a toric radially inner curved portion of said first chamber and extending radially and outwardly to merge into said second chamber and each chamber having outlet means in said stator entrance end having a narrow outlet opening at the radial outer part of said stator portion and semicircular outlet pockets within said outlet opening forming a dividing edge therebetween and having a slightly smaller outer toric radius than said stator portion and curved similar to and with substantially the same axial width and inner toric radius as said stator portion to avoid loss of retarding capacity and located radially within said outlet opening and both said outlet opening and outlet pockets extending only over a small portion of the circumference of the chamber to convert the velocity pressure head of a portion of the toroidal flow in each chamber moving from the bladed rotor portion to the bladed stator portion to outlet flow and pressure head and to provide retarding in the outlet opening and to retain a portion of the toroidal flow in the toroidal flow path in said outlet pockets for retarding so the retarding in said outlet means is substantially the same as a like circumferential portion of said stator portion.

13. In a retarder; a stator housing; a rotor mounted for rotation in said stator housing about an axis; said stator housing having an end wall on each side of said rotor and an intermediate axial peripheral wall enclosing said rotor; a first toroidal flow chamber between one end wall and one side of said rotor; a second toroidal flow chamber between the other end wall and the other side of said rotor; each chamber having an annular bladed stator portion on an end wall and an annular bladed rotor portion on the adjacent side of said rotor both coaxial with said axis, said stator portions and said rotor portions having a semi-circular cross section and each adjacent pair of stator and rotor portions located on opposite sides of a central plane transverse to the axis with the curved portion extending away from said central plane to form a chamber; said rotor portion during rotation of the rotor with fluid in the chamber circulating fluid in a toroidal flow path radially, outwardly and circumferentially in said rotor portion, axially from said rotor portion to said stator portion, radially inward in said stator portion and axially to said rotor portion; inlet passage means of small circumferential extent having an inlet stator portion similarly curved and axially wider than said stator portion and port means extending radially inwardly to said inlet stator portion of said first chamber having one radial transverse wall portion tangent to the central axially widest portion of the curved inlet stator portion of said toroidal flow chamber and another radial transverse wall intermediate the axial widest portion of said stator portion and said central plane intersecting said inlet stator portion between the radial toric center and outer toric radius and said inlet stator portion between the outer toric radius and said another wall having substantially the same curvature as said stator portion of said first toroidal chamber providing inlet flow at an intermediate pressure portion, and substantially with the central inlet flow vector aligned with the outer toroidal section radius toroidal flow path vector to add the high toroidal flow velocity pressure head to the inlet pressure head for injection of fluid into the first chamber transfer passage means in said rotor extending tangentially from the central part of said radially inner curved portion of said bladed rotor portion of said first chamber radially outward and axially to said bladed rotor portion of said second chamber to substantially equally divide inlet flow to fill both chambers and each chamber having outlet means having an outlet opening at the toric radial outer part of said bladed stator portion facing said rotor to receive toroidal flow directly from said rotor portion and a similarly curved semi-circular outlet stator portion radially within said outlet opening having a smaller outer radius and substantially the same axial width and inner radius as said stator portion to avoid loss of retarder capacity and extending over another small portion of the circumference of the chamber to convert the velocity pressure head of a portion of the toroidal flow in each chamber moving from the bladed rotor portion to the bladed stator portion to outlet flow and pressure head and to provide retarding in the outlet opening and to retain a portion of the toroidal flow in the toroidal flow path in said outlet stator portion so the retarding in said outlet means is not reduced as compared to a like circumferential part of said stator portion.

14. In a retarder; a retarder having a retarder chamber with inlet means, outlet means, a bladed stator and a bladed rotor circulating fluid from said inlet means through said rotor and stator in said chamber and out through said outlet means with pumping action providing a pressure differential between said inlet and outlet means; a sump; a source of fluid pressure connected to said sump supplying fluid flow under pressure from said sump; a cooler having an inlet and outlet and providing a flow restriction therebetween; a low pressure regulator valve; retarder valve means having a retarder off position and a range of retarder on positions from minimum on position to full on position, having controlled variable area restriction exhaust means and connected to said source, retarder inlet means, retarder outlet means, cooler inlet, cooler outlet and low pressure regulator valve operative in a retarder off position to connect said source to said cooler inlet and said cooler outlet to said low pressure regulator valve to regulate source pressure at a higher value increased by said cooler restriction and return said source flow to said sump, exhausting the retarder outlet means and blocking the retarder inlet means and operative on movement throughout said range of retarder on positions to connect said source and retarder outlet means to said cooler inlet and said cooler outlet to said retarder inlet means providing a closed loop circuit including said retarder inlet means, said retarder chamber, said retarder outlet means, said cooler and cooler outlet with a flow capacity always sufficient for loop circuit flow without significant change of restriction by said movement throughout said range of retarder on positions and flow circulated by said retarder pressure differential through the cooler restriction; and said cooler outlet and retarder inlet means being connected by said controlled variable area restriction exhaust means to exhaust and said variable area restriction exhaust means being initially open and progressively more restricted directly by progressive retarder valve means movement from minimum on position to full on position to progressively increase retarder inlet means pressure and retarder power and in parallel to said low pressure relief valve to limit retarder inlet means pressure and retarder power and return the excess of said supply flow to said sump.

15. In a retarder; retarder means having an inlet passage, an outlet passage, a bladed stator and a bladed rotor forming a retarder chamber with said inlet passage connected to supply fluid to said chamber, and said outlet passage connected to said chamber and said rotor during rotation circulating fluid in a loop circuit from said chamber through said inlet passage and said outlet passage with return to said chamber and providing retarder power capacity increasing as a high exponential function of rotor speed, a restriction in said outlet passage and control means having a manually controlled valve having movement from a minimum retarding position, increasing retarding through a range of partial retarding positions to full retarding position and operative to establish said loop circuit in all retarding positions without significant change in restriction by said movement and to supply fluid to said inlet passage at a pressure limited to a low range of values between a minimum and maximum pressure so that the employed minimum to maximum retarder power capacity range is limited to the lower portion of the available retarder power capacity increasing with a moderate exponential increase approaching maximum employed power capacity with increasing retarder speed and the inlet pressure being controlled by said manually controlled valve between said minimum pressure and said maximum pressure with valve movement and increasing said inlet pressure exponentially with constant increment valve movement increasing retarding through a range of partial retarding positions to provide an employed power capacity increasing as a straighter line function relative to constant increment valve movement.

16. In a retarder; retarder means having an inlet passage, an outlet passage, a bladed stator and a bladed rotor forming a retarder chamber with said inlet passage connected to supply fluid to said chamber, and said outlet passage connected to said chamber and said rotor during rotation circulating fluid in a loop circuit from said chamber through said inlet passage and said outlet passage with return to said chamber and providing retarder power capacity increasing as a high exponential function of rotor speed, a restriction in said outlet passage and control means having a manually controlled valve having movement from a minimum retarding position increasing retarding through a range of partial retarding positions to full retarding position operative to establish said loop circuit in all retarding positions without significant change in restriction by said movement and having variable exhaust area means connected to exhaust said inlet passage decreasing exhaust area as a negative exponential function of constant increment movement increasing retarding through a range of partial retarding positions and operative to supply fluid to said inlet passage at a pressure limited to a low range of values between a minimum and maximum pressure so that the employed minimum to maximum retarder power capacity range is limited to the lower portion of the available retarder power capacity increasing with a moderate exponential increase approaching maximum employed power capacity with increasing retarder speed and the inlet pressure being controlled by said manually controlled valve between said minimum pressure and said maximum pressure increasing inversely exponentially as a function of said decreasing exhaust area with said constant increment valve movement increasing retarding through a range of partial retarding positions to provide an employed power capacity increasing as a straighter line function relative to valve movement for partial retarding.

17. The invention defined in claim 16 and said manually controlled valve having said variable area exhaust means operative to control retarder inlet pressure by substantially constantly decreasing two dimensions of said exhaust area with constant increment valve movement to exponentially decrease exhaust area with constant valve movement.

18. The invention defined in claim 16 and said variable area restricted exhaust means decreasing the area exponentially to reduce power capacity at substantially the same high exponential rate as retarder power capacity increases with speed relative to constant increment valve movement to provide increasing retarder power capacity as a substantially straight line function of constant valve movement and rotor speed.

19. In a retarder; retarder means having an inlet passage, an outlet passage, a bladed stator and a bladed rotor forming a retarder chamber with said inlet passage connected to supply fluid to said chamber and said outlet passage connected to said chamber and said rotor during rotation pumping fluid from said inlet passage to said outlet passage and providing a pressure differential between said inlet passage and said outlet passage for retarder circulating flow and power capacity increasing as a function of rotor speed, a constant restriction, a fluid supply and control valve means connected to said inlet passage, outlet passage, constant restriction and fluid supply operative on movement throughout a range of retarder on positions from minimum retarder on position to full retarder on position to connect said outlet passage through said constant restriction to said inlet passage in a loop circuit with a flow capacity always sufficient for loop circuit retarder circulating flow by said rotor through said constant restriction without significant change of loop circuit restriction in the control valve means by said movement from minimum retarder on position to maximum retarder on position and to connect said fluid supply to the loop circuit and having variable area exhaust means having a variable exhaust area and connected to said inlet passage for exhausting fluid from said inlet passage through said variable exhaust area operative to progressively decrease the area of said variable exhaust area directly by said movement of said control valve means from said minimum retarder on position progressively to said maximum retarder on position to progressively increase inlet passage pressure and retarder power in response to said control valve means movement from minimum retarder on position to full retarder on position.

20. The invention defined in claim 19 and said control valve means controlling said variable area exhaust means to provide a large exhaust area in response to said control valve means in said minimum retarder on position and to exponentially reduce said exhaust area with constant increments of control valve means movement to said retarder full on position for straighter line increase of inlet passage means pressure and retarder power with constant increments of control valve means movement in the retarder on range.

21. The invention defined in claim 19 and said control means including a variable area exhaust restriction control means movable from a minimum retarder on position through partial retarding positions to a full retarder on position having a variable area exhaust restriction reducing the area negatively exponentially to inversely exponentially increase retarder inlet pressure to provide substantially straight line increase of retarder capacity with valve position constantly increasing retarding in the partial retarding range.

22. The invention defined in claim 19 and said rotor providing toroidal flow in said chamber, said inlet passage having injection pumping means at said chamber providing inlet pumping flow varying essentially in proportion to toroidal flow velocity and said outlet passage having ejection pumping means at said chamber providing outlet pumping flow varying essentially in proportion to toroidal flow velocity for providing loop circuit circulation flow in proportion to toroidal flow velocity and retarder power.

23. The invention defined in claim 22 and said control valve means controlling said variable area exhaust means to provide a large exhaust area in response to said control valve means in said minimum retarder on position and to exponentially reduce said exhaust area with constant increments of valve means movement to said retarder full on position.

24. The invention defined in claim 22 and said control valve means controlling said variable area exhaust means operative to increase retarder inlet pressure by substantially constantly decreasing two dimensions of the area of said variable exhaust area means to exponentially decrease the area of said variable exhaust area means with constant increments of movement of said control valve means from minimum to full retarder on positions to increase retarder power in a straight line relation to said constant increments of movement of said control valve means from minimum to full retarder on position.

25. The invention defined in claim 22 and said control valve means controlling said variable area exhaust means decreasing the area exponentially to reduce power capacity at substantially the same high exponential rate as retarder power capacity increases with speed relative to constant increments of movement of said valve means from minimum to full retarder on positions to provide increasing retarder power capacity as a substantially straight line function of said constant increments of movement of said valve means and rotor speed.

26. In a retarder; a stator housing; a rotor mounted for rotation in said stator housing for rotation about an axis; toroidal flow chamber means having a bladed stator shell having an entrance half beginning at an inlet end and an outlet end on said stator housing and a bladed rotor shell on said rotor providing a toroidal flow chamber having an outer toroidal surface provided by said stator and rotor shells at their normal outer toroidal section perimeter and circulating fluid during rotation of said rotor in a toroidal flow path through said rotor shell to said stator shell at highest velocity and through said stator shell to said rotor shell in said toroidal flow path; said stator shell having circumferentially small inlet flow means having an inlet stator shell portion having an inlet end perimeter portion having substantially the same curvature as the like portion of the perimeter of said stator shell beginning at the inlet end and ending centrally of the entrance half of said inlet stator shell portion and an outlet end perimeter portion having substantially the same toroidal section radius as the like portion of the toroidal section perimeter of said stator shell and an intermediate perimeter portion between said end perimeter portions having a larger toroidal section radius than the like portion of said stator shell and inlet passage means connected to said intermediate perimeter portion of said inlet stator shell portion for merging inlet flow with the high velocity toroidal flow in said inlet end perimeter portion between said inlet end perimeter portion and a central portion of said inlet stator shell portion for merging inlet flow with the high velocity toroidal flow in said inlet perimeter portion of said inlet stator shell portion for injection pumping action and outlet flow means for outlet flow from said chamber.

27. In a retarder; retarder means having an inlet passage, an outlet passage, bladed stator means and bladed rotor means forming a retarder chamber, said inlet passage connected to supply fluid to said chamber, said outlet passage connected to said chamber and said rotor during rotation circulating fluid in a toroidal flow path at a toroidal flow velocity through said rotor and stator providing retarder power capacity; said inlet passage and chamber at their connection having inlet injection pumping means providing inlet pumping flow varying essentially in proportion to said toroidal flow velocity; said outlet passage and chamber at their connection having outlet ejection pumping means providing outlet pumping flow varying essentially in proportion to said toroidal flow velocity; a restriction; manual control valve means operatively connected to said outlet passage, inlet passage and restriction and movable from a retarder off position to a range of retarder on positions from a low retarder on to a high retarder on position, operative on movement throughout said retarder on range of positions for connecting said retarder chamber, outlet passage, restriction and inlet passage in a loop circuit in that order for loop circuit flow circulated by both said pumping means and having a flow capacity sufficient for said loop circuit flow without significant restriction change by said movement and for supplying fluid to said loop circuit and increasing retarding through said range of retarder on positions having variable area exhaust means connected to said inlet passage to provide an exhaust area decreasing as a negative exponential function of constant increment valve means movement and position increasing partial retarding to inversely increase retarder inlet passage pressure as a positive exponential function to increase retarder power capacity substantially as a straight line function of constant increment valve movement and position and operative in retarder off position to exhaust said retarder chamber.

28. The invention defined in claim 27 and said variable area exhaust means having a valve bore with an inlet port connected to said inlet passage and an exhaust port and a valve element in said bore with a cylindrical land with a straight tapered recess in the land cooperating with said ports to vary the exhaust area decreasing as a negative exponential function of constant increment valve movement and position.

29. In a retarder; retarder means having an inlet passage; an outlet passage, bladed stator means and bladed rotor means forming a circular toroidal retarder chamber, said inlet passage connected to supply fluid to said chamber, said outlet passage connected to said chamber and said rotor means during driven rotation circulating fluid in a toroidal flow path at a toroidal flow velocity through said rotor and stator means providing retarder power capacity; said inlet passage and chamber at their connection having inlet injection pumping means providing inlet pumping flow varying essentially in proportion to said toroidal flow velocity; said outlet passage and chamber at their connection having outlet ejection pumping means providing outlet pumping flow varying essentially in proportion to said toroidal flow velocity; a cooler having a restriction; manual control valve means operatively connected to said outlet passage, inlet passage and cooler and movable from a retarder off position to a range of retarder on positions from a low retarder on position to a high retarder on position, operative on movement throughout said retarder on range of retarder on positions for connecting said retarder chamber, outlet passage, cooler and inlet passage in a loop circuit in that order for loop circuit flow circulated by both said pumping means and having a flow capacity sufficient for said loop circuit flow without significant restriction change by said valve means movement and for supplying fluid to said loop circuit and increasing retarding through said range of retarder on positions having exhaust means connected to said inlet passage to progressively decrease exhaust from said inlet passage to exhaust in response to valve means movement progressively from low retarder on position to high retarder on position to progressively increase retarder inlet passage pressure to progressively increase retarder power capacity as a straighter line function of progressive valve means movement and operative in retarder off position to exhaust said retarder chamber.

30. In a retarder: retarder means having an inlet passage, an outlet passage, bladed stator means and bladed rotor means forming a circular toroidal retarder chamber, said inlet passage connected to supply fluid to said chamber, said outlet passage connected to said chamber and said rotor means during driven rotation in a forward direction about the retarder axis circulating fluid in a toroidal flow path at a toroidal flow velocity through said chamber having a region of high velocity toroidal flow at the outer radial portion and a region of lower velocity toroidal flow at the inner radial portion of said stator means and said rotor means forming said chamber and providing retarder power capacity; said inlet passage and chamber at their connection having inlet injection pumping passage means located completely within said stator means and having a circumferentially limited tangential connection with said chamber in said region of high velocity toroidal flow providing inlet pumping flow tangential to said toroidal flow path in said region of high velocity toroidal flow varying essentially in proportion to said toroidal flow velocity; said outlet passage and chamber at their connection having outlet ejection pumping passage means located in said stator means having a circumferentially limited connection with said retarder chamber located circumferentially ahead of said inlet injection pumping passage means in the direction of rotation of said rotor means and having an inlet portion located in the radially external axially directed portion of said toroidal flow path parallel to said axis in said region of high toroidal flow velocity so that the axial portion of said toroidal flow is directed toward said inlet portion providing outlet pumping flow varying essentially in proportion to said toroidal flow velocity; a cooler having a restriction; manual control valve means operatively connected to said outlet passage, inlet passage and cooler and movable from a retarder off position to a range of retarder on positions from a low retarder on position to a high retarder on position, operative on movement throughout said range of retarder on positions for connecting said retarder chamber, outlet passage, cooler and inlet passage in a loop circuit in that order for loop circuit flow circulated by both said pumping passage means proportional to toroidal flow velocity and having a flow capacity sufficient for said loop circuit flow without significant restriction change by said valve means movement and for supplying fluid to said loop circuit and increasing retarding through said range of retarder on positions having exhaust means connected to said inlet passage to progressively decrease exhaust from said inlet passage to exhaust in response to said valve means movement progressively from low retarder on position to high retarder on position to progressively increase retarder inlet passage pressure to progressively increase retarder power capacity as a straighter line function of said progressive valve means movement and operative in retarder off position to exhaust said retarder chamber.

31. The invention defined in claim 30, and said manual control valve means having exhaust means connected to said inlet passage to progressively exponentially decrease exhaust from said inlet passage to exhaust in response to uniform valve means movement.

* * * * *